(12) United States Patent
Fischer (10) Patent No.: US 12,304,749 B2
(45) Date of Patent: May 20, 2025

(54) TURN-BOLT DEVICE FOR A TRANSPORTING STAR WHEEL

(71) Applicant: KRONES AG, Neutraubling (DE)

(72) Inventor: Thomas Fischer, Burglengenfeld (DE)

(73) Assignee: KRONES AG, Neutraubling (DE)

( * ) Notice: Subject to any disclaimer, the term of this patent is extended or adjusted under 35 U.S.C. 154(b) by 165 days.

(21) Appl. No.: 18/082,171

(22) Filed: Dec. 15, 2022

(65) Prior Publication Data

US 2023/0192420 A1 Jun. 22, 2023

(30) Foreign Application Priority Data

Dec. 16, 2021 (DE) .......................... 102021133500.0

(51) Int. Cl.
*B65G 47/84* (2006.01)
*B33Y 80/00* (2015.01)

(52) U.S. Cl.
CPC ............ *B65G 47/846* (2013.01); *B33Y 80/00* (2014.12); *B65G 2201/0244* (2013.01)

(58) Field of Classification Search
CPC .......... B65G 47/846; B65G 2201/0244; B65G 47/847; B33Y 80/00
See application file for complete search history.

(56) References Cited

U.S. PATENT DOCUMENTS

| 5,096,042 A * | 3/1992 | Loll ...................... B67C 7/0046 198/441 |
| 10,925,789 B2 | 2/2021 | Ishibashi et al. |
| 10,925,798 B2 * | 2/2021 | Ishibashi ................. F16C 11/06 |
| 2016/0355354 A1 * | 12/2016 | Fahldieck .............. B65G 29/00 |
| 2019/0291971 A1 * | 9/2019 | Schulnig ............. B65G 47/847 |
| 2022/0296975 A1 * | 9/2022 | Krick ..................... B33Y 80/00 |

FOREIGN PATENT DOCUMENTS

| CN | 114589722 A * | 6/2022 | ............. B25J 15/00 |
| DE | 3838007 A * | 5/1990 | ............. B07C 5/362 |
| DE | 19536692 A1 * | 8/1996 | ............. B08B 9/42 |
| DE | 29602798 U1 * | 9/1996 | .......... B65G 47/847 |
| DE | 102014107538 B3 * | 9/2015 | .......... B65G 47/847 |
| EP | 0534942 B1 | 3/1994 | |
| WO | WO-9005102 A1 * | 5/1990 | |
| WO | WO-2017059208 A1 * | 4/2017 | ............. B33Y 10/00 |
| WO | WO-2018108248 A1 * | 6/2018 | .......... B65G 47/846 |

* cited by examiner

*Primary Examiner* — Gene O Crawford
*Assistant Examiner* — Abby A Jorgensen
(74) *Attorney, Agent, or Firm* — Caesar Rivise, PC (57) ABSTRACT

The invention relates inter alia to a turn-bolt device for a transporting star wheel, preferably a sorting star, for transporting containers. The turn-bolt device has a bearing body and a rotary member having an actuating region for actuating the rotary member, a bolt region for holding a container and a shaft region which integrally interconnects the actuating region and the bolt region and is rotatably mounted in the bearing body. The bearing body and the rotary member are formed from a plurality of adjoining material layers which are preferably manufactured additively.

20 Claims, 4 Drawing Sheets

TURN-BOLT DEVICE FOR A TRANSPORTING STAR WHEEL

CROSS REFERENCE TO RELATED APPLICATIONS

This application claims the benefit under 35 U.S.C. § 119(a) of German Patent Application No. DE 10 2021 133 500.0, filed Dec. 16, 2021 entitled TURN-BOLT DEVICE FOR A TRANSPORTING STAR WHEEL, and whose entire disclosure is incorporated by reference herein.

TECHNICAL FIELD

The invention relates to a turn-bolt device, to a transporting star wheel, to a method for producing a turn-bolt device and to a computer program product.

TECHNICAL BACKGROUND

EP 0 534 942 B1 relates to a sorting star for container-handling machines, comprising a rotatably drivable star plate and turn-bolt devices arranged on the outer periphery thereof, each turn-bolt device having a housing fixed to the star plate, which housing is provided with a bearing bore pointing towards the periphery of the star plate, a shaft which can be rotated in the bearing bore by approximately 90 degrees between two end positions, a locking bolt which is rotationally fixed to the outer shaft end protruding out of the housing and the outer periphery of the star plate, and a shifting apparatus which can be force-actuated by an actuation means to rotate the shaft between two end positions.

The turn-bolt device conventionally consists of a plurality individual parts which have to be fixed to one another. Major assembly work is required to do this. Producing the locking bolt can require complicated milling work to adapt the locking bolt to the respective container shapes. Due to the solid design of the locking bolt, in the event of a crash, the assembly and adjacent assemblies can be considerably damaged. Since the turn-bolt devices are also permanently installed in the star, it is relatively labour-intensive to replace the turn-bolt device.

The invention addresses the problem of providing an improved turn-bolt device for a transporting star wheel, preferably a sorting star.

SUMMARY OF THE INVENTION

The problem is solved by the features of the independent claims. Advantageous developments are indicated in the dependent claims and the description.

One aspect of the present disclosure relates to a turn-bolt device (rotary interlock device or locking bolt device) for a transporting star wheel, preferably a sorting star (radial sorter), for transporting containers. The turn-bolt device comprises a (n e.g. elongate) bearing body and a rotary member having an actuating region for actuating the rotary member, a (e.g. hook-shaped, claw-shaped or bracket-shaped) bolt region for holding (e.g. securing) a container and a shaft region which integrally interconnects the actuating region and the bolt region and is rotatably mounted in the bearing body. Particularly preferably, the bearing body and the rotary member (e.g. in each case) are formed from a plurality of adjoining (e.g. superimposed), preferably additively manufactured (e.g. the same in at least some portions) material layers (e.g. made of plastics material, preferably PA—polyamide, such as PA12).

Advantageously, the turn-bolt device makes it possible for the entire assembly to be additively or generatively manufactured collectively as one component, e.g. in the powder bed process. As a result, complex assembly of individual parts of the turn-bolt device can be omitted, which leads to cost advantages during assembly. By means of the additive manufacturing, complex milling can be dispensed with, which leads to additional cost advantages during the manufacturing of individual parts. The additive manufacturing also allows a completely free design of the bolt region so that this region can be adapted to a wide variety of different container shapes and sizes. In the case of additive manufacturing, in particular a material can be selected which, in the event of a malfunction (e.g. jamming), would prevent greater damage to the assembly and the surrounding assemblies, since the bolt region would simply break off in the event of a crash (predetermined breaking point).

In one exemplary embodiment, the bearing body and/or the rotary member comprises a plurality of, preferably ball-shaped, reinforcement parts, preferably made of a glass material, which are embedded in the material layers. Advantageously, the turn-bolt device can thus be substantially reinforced and less susceptible to wear.

In another exemplary embodiment, the rotary member can be rotated, preferably by approximately 90°, between a locking position (for example with a horizontally oriented bolt region) for holding a container by means of the bolt region, and a release position (for example with a vertically oriented bolt region) for releasing the container. Preferably, the rotary member can be locked (e.g. directly or indirectly), preferably magnetically, in the locking position and/or in the release position. Advantageously, it can thus be ensured that the bolt region can be held in the locking position and/or release position without needing to be permanently actuated.

In another exemplary embodiment, the bearing body has a receiving portion in which a magnet which locks (e.g. directly or indirectly) the rotary member in one of the locking position and the release position is arranged, preferably is adhesively bonded. Optionally, the bearing body can comprise another receiving portion in which another magnet which locks (e.g. directly or indirectly) the rotary member in the other of the locking position and the release position is arranged, preferably is adhesively bonded. Advantageously, magnetic locking is thus made possible in a simple manner in the additively manufactured turn-bolt device.

In one embodiment, the turn-bolt device further comprises an additional rotary member, which is rotatably mounted in the bearing body and is connected to the rotary member for rotation, preferably so as to mesh with one another. Preferably, the additional rotary member can be formed from a plurality of adjoining (e.g. superimposed), preferably additively manufactured, material layers (e.g. by embedding for example ball-shaped reinforcement parts preferably made of a glass material). Alternatively or additionally, the additional rotary member can have a (n e.g. additional) receiving portion in which a (n e.g. additional) magnet is arranged for locking the rotary member (e.g. indirectly by means of the additional rotary member being locked). Advantageously, the rotary member can thus be magnetically locked, e.g. in the locking position and/or in the release position, indirectly by means of the additional rotary member.

By way of example, in one of the locking position and the release position, the magnet in the receiving portion of the additional rotary member can be opposite the magnet in the receiving portion of the bearing body. Alternatively or additionally, in the other of the locking position and the release position, the magnet in the receiving portion of the additional rotary member can be opposite the magnet in the other receiving portion of the bearing body.

In another exemplary embodiment, the additional rotary member has a (n e.g. additional) gear portion which meshes with a gear portion of the actuating region. Advantageously, an operative connection between the rotary member and the additional rotary member can thus be made possible.

In another exemplary embodiment, the additional rotary member has a (n e.g. additional) lever arm portion for actuation by a cam or a control curve. Advantageously, the rotary member can thus be actuated for rotation so that the rotary member can be rotated in turn, e.g. from the locking position to the release position or vice versa.

In one embodiment, the bearing body has a preferably annular-segment-shaped ramp region, on which the rotary member, preferably the actuating region of the rotary member, is guided to reduce longitudinal play of the rotary member during the rotation of the rotary member. Advantageously, longitudinal play of the rotary member, which play is present as a result of production, can thus at least be minimised. The container can thus be held particularly securely in the locking position of the rotary member.

By way of example, the ramp region can be arranged on a rear surface of the bearing body which faces away from the locking bolt and/or which faces a lever arm portion of the actuating region. Alternatively or additionally, the ramp region can be arranged coaxially with a longitudinal axis of the shaft region or extend coaxially with the longitudinal axis. Alternatively or additionally, the ramp region can be opposite an end face of the actuating region which faces the bearing body.

In another embodiment, the bearing body has a (e.g. elongate) hole, preferably a through-hole, in which the shaft region is rotatably mounted, preferably in a sliding manner. Particularly preferably, the bearing body has at least one passage along the shaft region which interconnects an outer periphery of the bearing body and the hole. Advantageously, through the at least one passage, loose material powder can be discharged outwards from the inside of the bearing body along the shaft region after the additive manufacturing to allow a particularly low-friction, sliding rotational mounting of the shaft region in the bearing body.

In one variant, the at least one passage is in the form of a slot which is oriented parallel to the shaft region. Alternatively or additionally, the at least one passage has a plurality of passages which are arranged at a distance from one another with respect to a longitudinal axis of the shaft region and/or on the same side of the bearing body.

By way of example, a plurality of the passages are arranged on an upper face of the bearing body, and/or a plurality of the passages are arranged on a lower face of the bearing body.

In another variant, the actuating region has a lever arm portion for actuation by a cam or a control curve, the lever arm portion preferably being arranged outside the bearing body. Advantageously, the rotary member can be actuated on the lever arm portion for rotation to the locking position.

In another variant, the actuating region has a gear portion for actuation by a (n e.g. additional) gear portion of an additional rotary member of the turn-bolt device, the gear portion of the actuating region preferably being arranged inside the bearing body. Advantageously, the rotary member can be actuated on the gear portion of the additional rotary member for rotation to the release position. On the other hand, by means of the gear portion for example a rotation of the rotary member can also be transmitted to the additional rotary member, e.g. to swivel out a lever arm portion of the additional rotary member.

Another aspect of the present disclosure relates to a transporting star wheel, preferably a sorting star, for transporting containers. The transporting star wheel has a plurality of turn-bolt devices as disclosed here, the plurality of turn-bolt devices being arranged, preferably in a uniform manner, around a periphery of the transporting star wheel. Optionally, the transporting star wheel can further have for example at least one star plate which has, on the periphery thereof, a plurality of preferably arcuate pockets for receiving the containers, wherein the plurality of turn-bolt devices are arranged for holding the containers in the plurality of pockets.

Preferably, the transporting star wheel can have a (e.g. first) cam or a (e.g. first) control curve for actuating the lever arm portion of the actuating region of the rotary member to move the rotary member, e.g. to the locking position. Preferably, the cam can be adjustable or controllable by a control unit.

Preferably, the term "control unit" can relate to an electronic system (e.g. in the form of a driver circuit or having a microprocessor(s) and memories) and/or a mechanical, pneumatic and/or hydraulic controller which, depending on the design thereof, can undertake open-loop and/or closed-loop control tasks and/or processing tasks. Even if the term "open-loop control" is used here, this can equally also include or mean "closed-loop control" or "open-loop control with feedback" and/or "process" where appropriate.

Preferably, the transporting star wheel can have a (e.g. second) cam or a (e.g. second) control curve for actuating the lever arm portion of the additional rotary member to move the additional rotary member and the rotary member, e.g. into the release position. Preferably, the cam can be rigid.

The transporting star wheel can preferably be included in a container-handling system (e.g. for producing, cleaning, coating, checking, filling, sealing, labelling, printing and/or packaging containers for liquid media, preferably beverages or liquid foods).

The containers can be in the form of for example bottles, cans, canisters, boxes, flasks etc.

Another aspect of the present disclosure relates to a method for producing a turn-bolt device, preferably as disclosed here, for a transporting star wheel, preferably a sorting star, for transporting containers. The method comprises additive manufacturing (e.g. 3D printing) of the turn-bolt device, having a (n e.g. elongate) bearing body and a rotary member having an actuating region for actuating the rotary member, a (e.g. hook-shaped-, claw-shaped or bracket-shaped) bolt region for holding (e.g. securing) a container and a shaft region which integrally interconnects the actuating region and the bolt region and is rotatably mounted in the bearing body, wherein the bearing body and the rotary member are additively manufactured together (e.g. in full), preferably in a powder bed process and/or with embedding (e.g. ball-shaped) reinforcement parts (e.g. made of glass material) (e.g. in the bearing body and/or the rotary member). Advantageously, by means of the method, the same advantages that have already been explained with reference to the turn-bolt device can be achieved.

In another exemplary embodiment, the rotary member is additively manufactured together with the bearing body, in part inside and in part outside the bearing body. Alternatively or additionally, the bearing body and the rotary member are additively manufactured together with a gap arranged therebetween, preferably in the range of a few tenths of a millimetre or hundredths of a millimetre. Alternatively or additionally, the bearing body and the rotary member are additively manufactured together in such a way that the rotary member is axially secured in the bearing body by the bolt region and the actuating region. Alternatively or additionally, during the additive manufacturing, an additional rotary member which is (e.g. directly) connected to the rotary member for rotation (e.g. so as to mesh with one another) is additively manufactured together with the bearing body and the rotary member.

By way of example, the shaft region and/or a gear portion of the actuating region can be additively manufactured together with the bearing body inside the bearing body. Alternatively or additionally, the bolt region and/or a lever arm portion of the actuating region can be additively manufactured together with the bearing body outside the bearing body.

In one embodiment, the method further comprises removing loose material powder which is arranged between the bearing body and the rotary member through at least one passage in the bearing body after the additive manufacturing.

In another embodiment, the method comprises positioning, preferably adhesively bonding, at least one magnet in the bearing body and/or in an additional rotary member of the turn-bolt device, preferably to (e.g. indirectly) magnetically lock the rotary member.

Another aspect of the present disclosure relates to a computer program product comprising (e.g. at least one computer-readable storage medium on which are stored) instructions which prompt an additive manufacturing device (e.g. a 3D printer) to produce a turn-bolt device as disclosed here in a plurality of material layers in an additive manufacturing process or to carry out a method as disclosed here.

The above-described preferred embodiments and features of the invention can be combined with one another as desired.

BRIEF DESCRIPTION OF THE DRAWINGS

Further details and advantages of the invention are described in the following with reference to the accompanying drawings, in which.

The embodiments shown in the drawings correspond at least in part, and therefore similar or identical parts are provided with the same reference signs and, for the explanation thereof, reference is also made to the description of the other embodiments and drawings in order to avoid repetition.

DETAILED DESCRIPTION OF EXEMPLARY EMBODIMENTS

Figure 1:
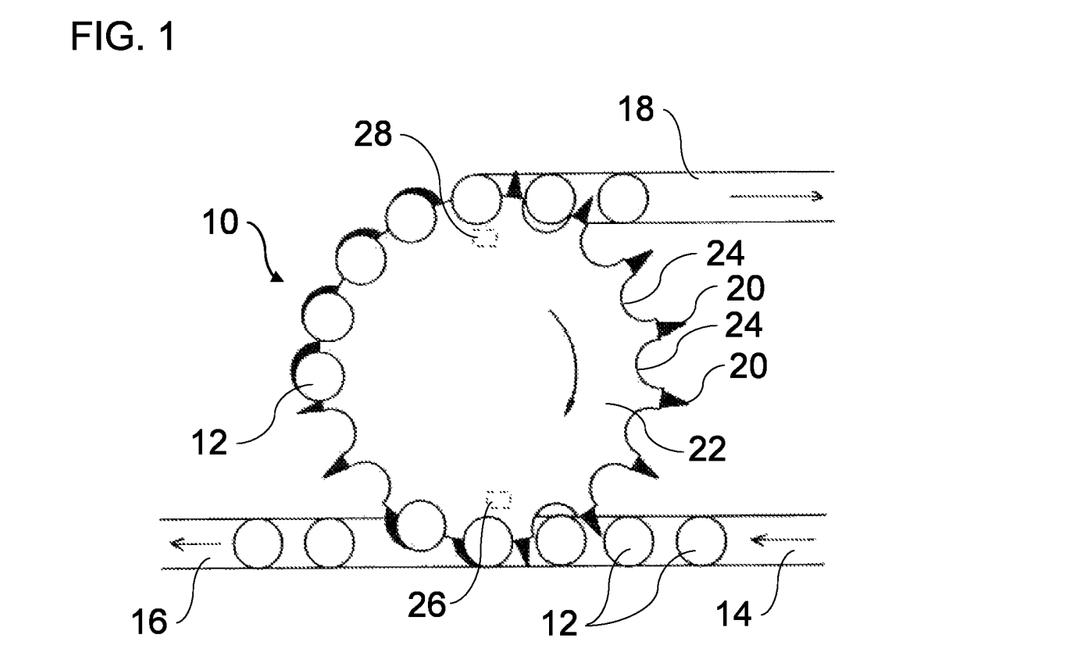
FIG. 1 is a schematic plan view of a transfer star wheel according to one exemplary embodiment of the present disclosure.
Figure 2:
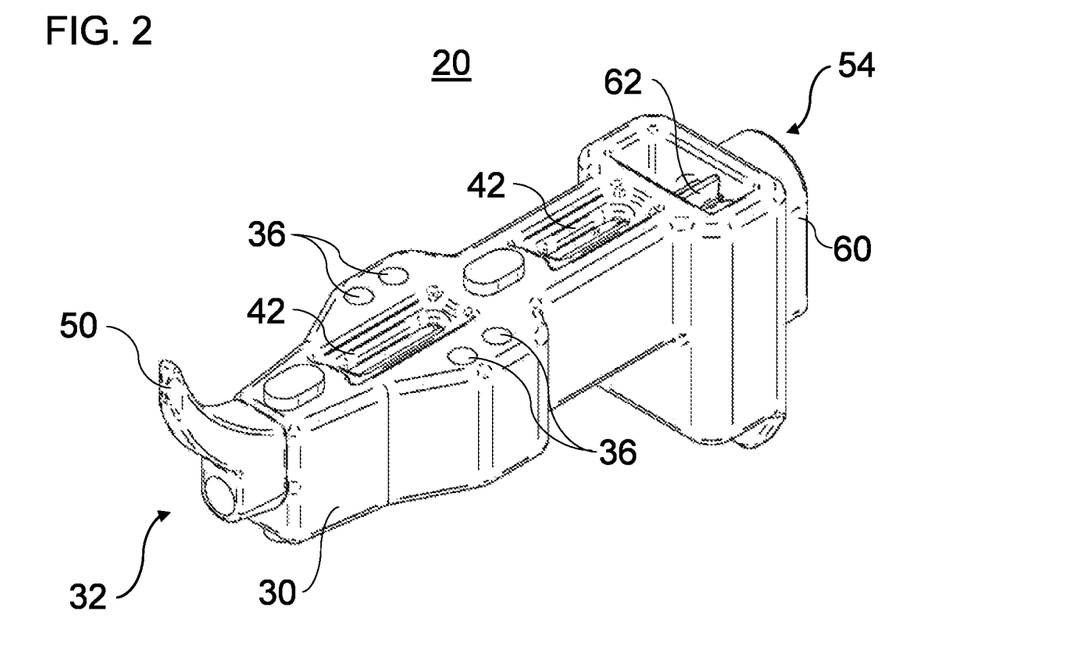
FIG. 2 is a perspective view of a turn-bolt device according to one exemplary embodiment of the present disclosure.
Figure 3:
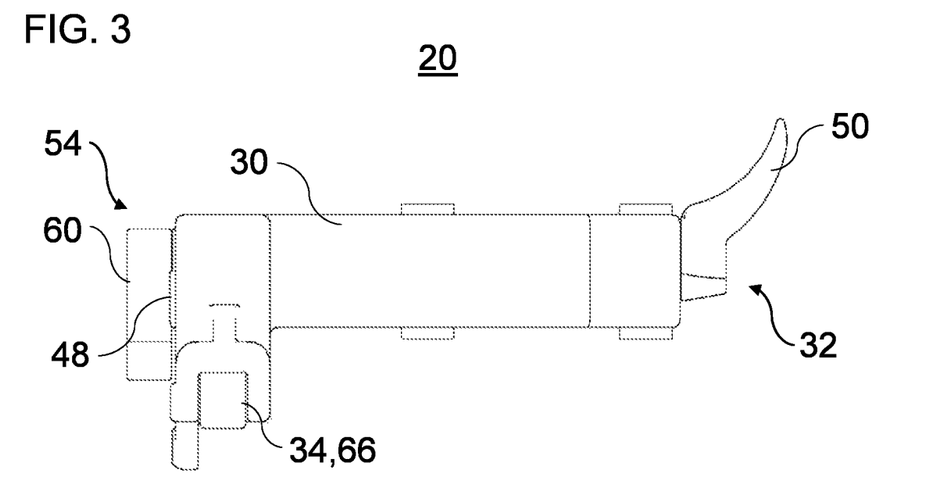
FIG. 3 is a side view of the exemplary turn-bolt device.
Figure 4:
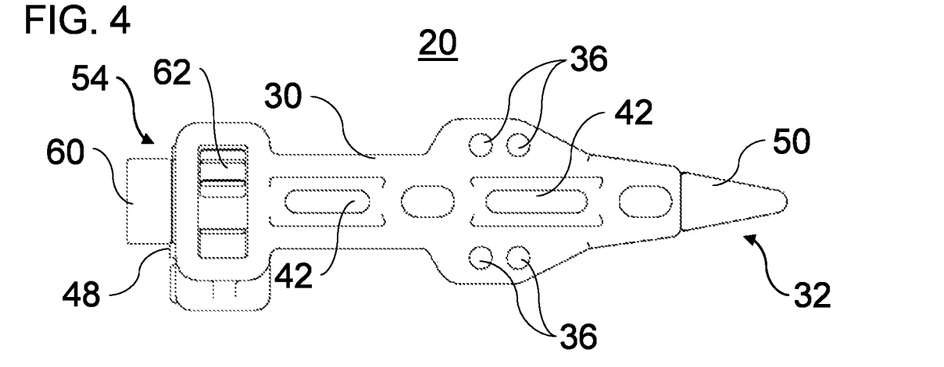
FIG. 4 is a plan view of the exemplary turn-bolt device.
Figure 5:
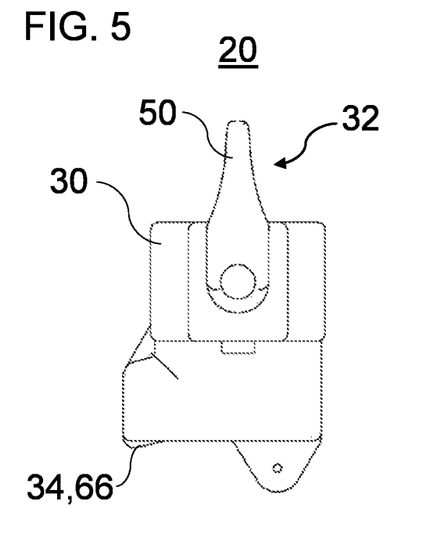
FIG. 5 is a front view of the exemplary turn-bolt device.

FIG. 1 shows a sorting star 10. Preferably, the sorting star 10 can be included in any portion of a container handling system for separating out or distributing containers 12. For example, by means of the sorting star 10, soiled or damaged containers 12 can be separated out after an inspection machine. Alternatively, by means of the sorting star 10, for example incorrectly filled or unsealed containers 12 can be separated out after a filling machine, or improperly labelled containers 12 can be separated out after a labelling machine. In the above-mentioned container handling machines, the sorting star 10 can be used as an outfeed star wheel or as an infeed star wheel for separating out foreign containers. Furthermore, the sorting star 10 can be used in the region between a labelling machine and a packaging machine in order to for example divide the container stream running out of the labelling machine in a single track into a plurality of lanes. In this case, for example a plurality of sorting stars 10 can be arranged one behind the other or side-by-side.

The sorting star 10 can connect a feed conveyor 14 to a first outfeed conveyor 16 and a second outfeed conveyor 18. The sorting star 10 can distribute the containers 12 from the feed conveyor 14 to the first outfeed conveyor 16 and the second outfeed conveyor 18 as desired. The conveyors 14, 16, 18 can be for example in the form of belt conveyors or mat-top conveyors, preferably mat-top chain conveyors. The feed conveyor 14 can arrive on the sorting star 10 tangentially with respect to a pitch circle of the sorting star 10. The outfeed conveyors 16, 18 can discharge from the sorting star 10 at different peripheral positions tangentially with respect to a pitch circle of the sorting star 10. The first outfeed conveyor 16 can preferably be arranged co-linearly with the feed conveyor 14. Alternatively however, other orientations between the first outfeed conveyor 16 and the feed conveyor 14 are also conceivable.

The sorting star 10 has a plurality of turn-bolt devices 20 for holding or securing the containers 12. The sorting star 10 can further have at least one rotatable star plate 22 having a plurality of receiving portions or pockets 24.

The turn-bolt devices 20 can be arranged uniformly around an outer periphery of the sorting star 10. By way of example, the turn-bolt devices 20 can be held on or fixed to the at least one star plate 22. Preferably, the turn-bolt devices are held or fixed between an upper star plate 22 and a lower star plate 22.

The at least one star plate 22 can have a plurality of receiving portions or pockets 24. The pockets 24 can be arranged around an outer periphery of the at least one star plate 22. One container 12 can be received in each pocket 24. Preferably, the pockets 24 and the turn-bolt devices 20 are arranged alternately around the outer periphery of the sorting star 10. The shape of the pockets 24 can be adapted to the shape of the containers 12. By way of example, the pockets 24 can be in the shape of a cylinder segment.

One of the pockets 24 can be assigned to each turn-bolt device 20. The turn-bolt devices 20 can be moved between a locking position and a release position. In the locking position, each turn-bolt device 20 can close or cover the assigned pocket 24 at least in part in order to convey a container 12 in the pocket 24. In the release position, the turn-bolt devices 20 can release the respectively assigned pocket 24 so that no container 12 is conveyed in the pocket 24.

The received container 12 can be conveyed in the respective pocket 24 when the assigned turn-bolt device 20 is in the locking position. The containers 12 received for example in the pockets 24 can thus be conveyed from the feed conveyor 14 to the second outfeed conveyor 18. Otherwise, when the assigned turn-bolt device 20 is in the release position, the container 12 can leave the respective pocket 24 again. Containers 12 received for example in the pockets 24 can thus be released to be conveyed away to the first outfeed conveyor 16 or to the second outfeed conveyor 18.

The turn-bolt devices 20 can be actuated so as to occupy the locking position and/or the release position. The actuation can take place for example mechanically, electrically, electromagnetically, pneumatically and/or hydraulically.

An actuation apparatus of the sorting star 10 can preferably have two cams 26, 28. The pockets 26, 28 can be arranged underneath the at least one star plate 22. The first cam 26 can be arranged in the transfer region between the feed conveyor 14, the sorting star 10 and the first outfeed conveyor 16. The second cam 28 can be arranged in the transfer region between the sorting star 10 and the second outfeed conveyor 18. The first cam 26 can actuate the turn-bolt devices 20 passing the first cam 26 so as to occupy the locking position. The second cam 28 can actuate the turn-bolt devices 20 passing the second cam 28 so as to occupy the release position.

The first cam 26 can be controllable or adjustable so that it is possible to control whether this cam actuates the turn-bolt devices 20 passing it or not. The adjustment of the first cam 26 can take place for example mechanically, electrically, electromagnetically, pneumatically and/or hydraulically, preferably controlled by a control unit of the sorting star 10.

If the first cam 26 is in the actuating position, it actuates the passing turn-bolt devices 20 so as to occupy the locking position. The containers 12 from the feed conveyor 14 arrive in the pockets 24 and are held in the locking position in these pockets by the assigned turn-bolt devices 20. The containers 12 can correspondingly be transported by means of the sorting star 10 from the feed conveyor 14 to the second outfeed conveyor 18. If the first cam 26 is outside the actuating position, it does not actuate the passing turn-bolt devices 20. The containers 12 arrive in the pockets 24 from the feed conveyor 14, but are not held in the pockets, since the assigned turn-bolt devices 20 are not moved into the locking position. Accordingly, the containers 12 can leave the pockets 24 again immediately. The containers 12 can correspondingly be transported from the feed conveyor 14 to the first outfeed conveyor 16.

The second cam 28 can be rigid or immovable so that it actuates all the passing turn-bolt devices 20 so as to occupy the release position. The containers 12 transported in the pockets 24 can thus be released by the turn-bolt devices 20 in the transfer region with the second outfeed conveyor 18 and transported away by the second outfeed conveyor 18.

Alternatively to the cams 26, 28, an actuation of the turn-bolt devices 20 can also be made possible for example by means of a mechanical control curve or in another way.

Even if the turn-bolt device 20 is included in the sorting star 10 in the preferred exemplary embodiment, the use of the turn-bolt device 20 is not limited thereto. By way of example, the turn-bolt device 20 could also be included in a transporting star wheel which transports containers 12 for example only from a feed conveyor to an outfeed conveyor.

FIGS. 2 to 10 show different views of an exemplary turn-bolt device 20 in the release position.

The turn-bolt device 20 has a bearing body 30 and a rotary member 32 having a bolt region 50, a shaft region 52 and an actuating region 54. Optionally, the turn-bolt device 20 can have an additional rotary member 34.

The bearing body 30 is formed from a plurality of adjoining material layers. The rotary member 32 is also formed from a plurality of adjoining material layers. Optionally, the additional rotary member 34 can also be formed from a plurality of adjoining material layers. The material layers are preferably additively manufactured. The bearing body 30, the rotary member 32 and/or the additional rotary member 34 can be additively manufactured for example from a plastics material. Particularly preferably, the bearing body 30, the rotary member 32 and/or the additional rotary member 34 have a plurality of reinforcement parts which are embedded in the material layers. The reinforcement parts can be for example ball-shaped and/or comprise a glass material.

Particularly preferably, the bearing body 30 and the rotary member 32 and optionally the additional rotary member 34 are additively manufactured together, preferably in a powder bed process. The rotary member 32 can be additively manufactured in part inside and in part outside the bearing body 30. By way of example, the shaft region 52 and a portion of the actuating region 54 of the rotary member 32 can be additively manufactured inside the bearing body 30. The bolt region 50 and another portion of the actuating region 54 of the rotary member 32 can be additively manufactured outside the bearing body 30. The bolt region 50 and the actuating region 54 of the rotary member 32 can secure the rotary member 32 axially in the bearing body 30. The additional rotary member 34 can also be additively manufactured inside the bearing body 30. When additively manufactured together, the bearing body 30, the rotary member 32 and optionally the additional rotary member 34 can be additively manufactured with a gap arranged therebetween which is preferably in the range of a few tenths of a millimetre or hundredths of a millimetre.

The bearing body 30 can have for example a plurality of mounting holes 36, a hole 38, a recess 40, at least one passage 42, at least one receiving portion 44, 46 and/or at least one ramp region 48.

The bearing body 30 can be designed for mounting the turn-bolt device 20 on the sorting star 10 (see FIG. 1). The turn-bolt device 20 can be attached to the sorting star 10 by means of the bearing body 30 in such a way that a longitudinal axis of the turn-bolt device 20 can extend radially to an axis of rotation or central axis of the sorting star 10. By way of example, the bearing body 30 can comprise the plurality of mounting holes 36 by which the bearing body 30 can be fixed, preferably screwed, to the sorting star 10, for example to the at least one star plate 22 thereof.

The bearing body 30 can rotatably mount the rotary member 32. By way of example, the bearing body 30 can comprise the hole 38 for rotatably mounting the rotary member 32 (see FIG. 8). The hole 38 is preferably in the form of a through-hole. The hole 38 can extend from a front side or front end face of the bearing body 30 through the bearing body 30 as far as a rear side or rear end face of the bearing body 30. The hole 38 can be parallel to a longitudinal axis of the turn-bolt device 20 or the bearing body 30. The rotary member 32 can be rotatably arranged in the hole 38. More specifically, the shaft region 52 of the rotary member 32 can be rotatably arranged in the hole 38. The rotatable mounting of the rotary member 32 in the hole 38 is preferably a sliding bearing. The bearing body 30 can form a housing for the shaft region 52.

The bearing body 30 can rotatably mount the additional rotary member 34, preferably on an axis of rotation parallel to an axis of rotation of the rotary member 32. More specifically, the bearing body 30 can have an axis and a rod-shaped or pin-shaped portion on which the additional rotary member 34 is rotatably mounted. The bearing body 30 can comprise the recess 40 in which the additional rotary member 34 is positioned. The recess 40 can extend through the bearing body 30 perpendicularly to the hole 38 or to the longitudinal axis of the bearing body 30 and open into the hole 38.

The at least one passage 42 of the bearing body 30 can interconnect an outer periphery of the bearing body 30 and the hole 38. The at least one passage 42 can be arranged in a portion along the shaft region 52. Preferably, the at least one passage 42 is in the form of a slot which is oriented parallel to the shaft region 52. Preferably, a plurality of passages 42 are included which are at a distance from one another with respect to a longitudinal axis of the shaft region 52. Preferably, in each case a plurality of passages 42 are arranged on the same side of the bearing body 30. By way of example, a plurality of passages 42 are arranged on an upper face of the bearing body 30, and a plurality of the passages 42 are arranged on a lower face of the bearing body 30. Through the at least one passage 42, after the additive manufacturing, loose material powder can be removed from the inside of the bearing body 30, preferably from a gap between the hole 38 and the shaft region 52.

Figure 6:
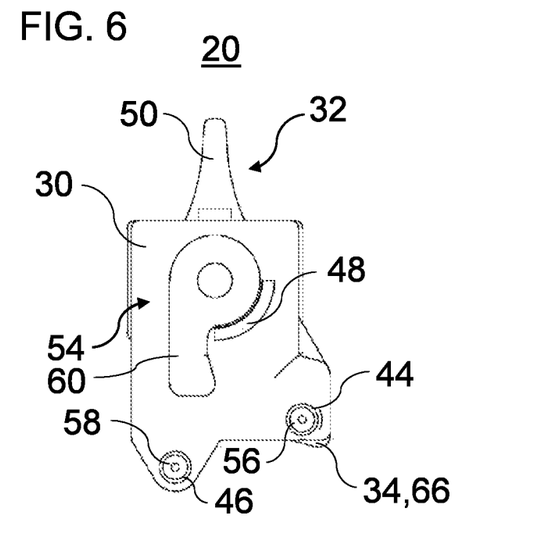
FIG. 6 is a rear view of the exemplary turn-bolt device.
Figure 7:
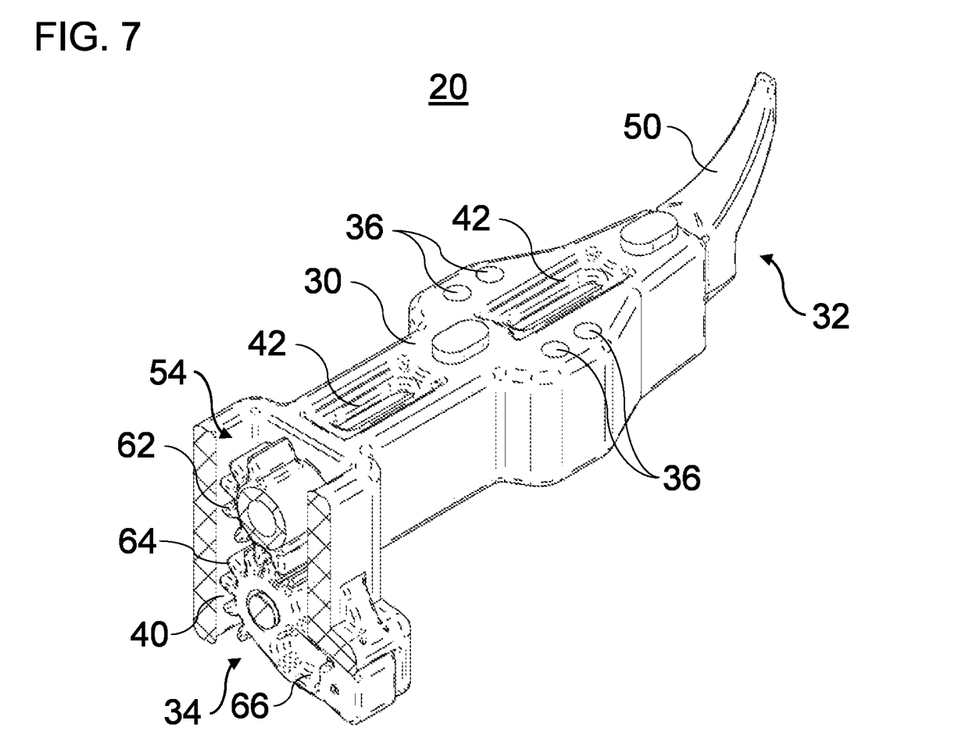
FIG. 7 is a perspective cross-sectional view through the exemplary turn-bolt device.
Figure 8:
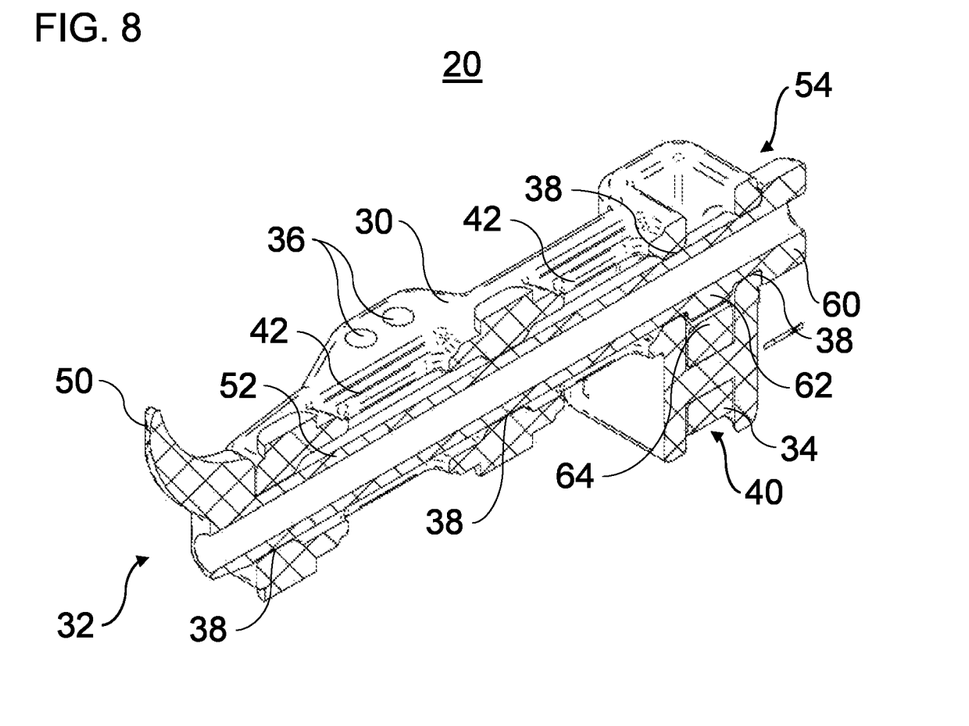
FIG. 8 is a perspective longitudinal sectional view through the exemplary turn-bolt device.
Figure 10:
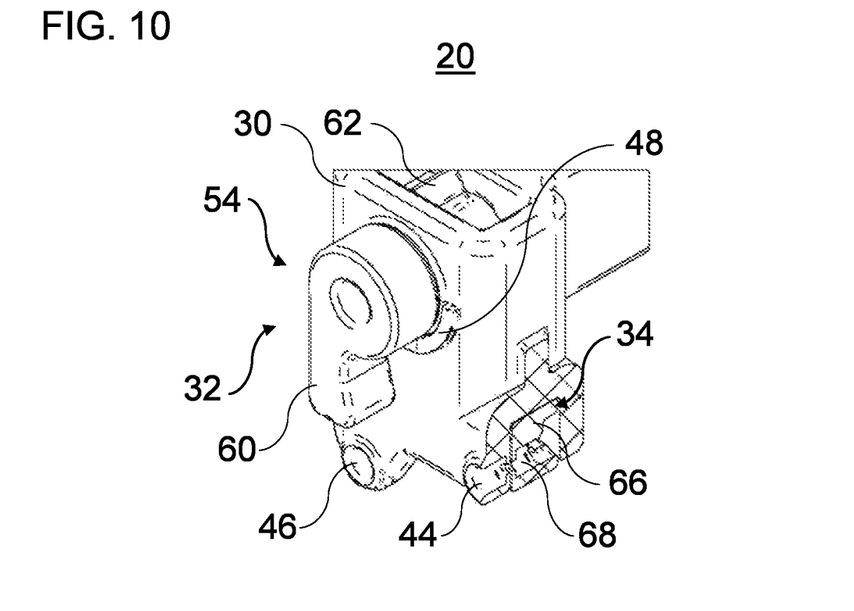
FIG. 10 is a perspective longitudinal sectional view through the exemplary turn-bolt device.

The turn-bolt device 20 can be designed to lock the rotary member 32 in a locking position and/or in a release position. Preferably, the locking can be magnetic. By way of example, in the receiving portion 44 of the bearing body 30, a (e.g. permanent)-) magnet 56 can be positioned to magnetically lock the rotary member 32 in the release position. Preferably, the magnet 56 can be adhesively bonded in the receiving portion 44. By way of example, in the other receiving portion 46 of the bearing body 30, a (e.g. permanent) magnet 58 can be positioned to magnetically lock the rotary member 32 in the locking position. Preferably, the magnet 58 can be adhesively bonded in the other receiving portion 46. FIG. 6 shows the receiving portions 44, 46 with the magnets 56, 58 positioned therein. FIG. 10 shows the receiving portions 44, 46 without the magnets 56, 58.

The bearing body 30 can be designed to reduce longitudinal play (play along a longitudinal axis) of the rotary member 32. The bearing body 30 can comprise the ramp region 48 which can reduce the longitudinal play. Preferably, the ramp region 48 can be annular-segment shaped, particularly preferably coaxially with a longitudinal axis of the shaft region 52. By way of example, the ramp region 48 can be arranged on a rear end face or rear side of the bearing body 30. When rotating the rotary member 32 from the release position to the locking position, the actuating region 54 can preferably contact the ramp region 48 and be guided along the ramp region 48. In so doing, the ramp region 48 can cause the rotary member 32, when rotating to the locking position, to additionally carry out a longitudinal movement in which the bolt region 50 and the shaft region 52 are moved towards the ramp region 48. In other words, the ramp region 48 can cause the rotary member 32, when rotating to the locking position, to additionally carry out a longitudinal movement in which the rotary member 32 is moved towards an axis of rotation or central axis of the sorting star 10 (see FIG. 1).

The bolt region 50 is designed to hold a container 12. By way of example, in the locking position of the rotary member 32, the bolt region 50 can hold a container 12 in a pocket 24 of the sorting star 10 (see FIG. 1). The shape of the bolt region 50 can be adapted to the shape of the containers 12. By way of example, the bolt region 50 can be hook shaped, claw shaped or bracket shaped. The bolt region 50 can form a foremost end of the rotary member 32. In the release position, the bolt region 50 can be oriented upright or vertically. In the locking position, the bolt region 50 can be oriented horizontally. In the locking position, the bolt region 50 can be in contact with an outer periphery of the held container 12. An angle of rotation between the release position and the locking position can be for example approximately 90°.

The shaft region 52 integrally interconnects the bolt region 50 and the actuating region 54. The shaft region 52 can be arranged between the bolt region 50 and the actuating region 54. At one end, the shaft region 52 can transition into the bolt region 50. At an opposite end, the shaft region 52 can transition into the actuating region 54. The shaft region 52 can be rotatably arranged in the hole 38 of the bearing body 30. The shaft region 52 can extend in a substantially elongate manner. The shaft region 52 can be in the form of a hollow shaft region.

The actuating region 54 is used to actuate the rotary member 32. More specifically, an actuating means (e.g. comprising the cams 26, 28—see FIG. 1) can actuate the rotary member 32 via the actuating region 54 so as to occupy the locking position and/or the release position. The actuating region 54 can form a rearmost end of the rotary member 32.

Preferably, the actuating region 54 can comprise a lever arm portion 60 and a gear portion 62.

The lever arm portion 60 can be arranged outside the bearing body 30. The lever arm portion 60 can be actuated for example by the first cam 26 (see FIG. 1) or a control curve in order to move the rotary member 32 into the locking position. In this case, the lever arm portion 60 can be rotated, for example by approximately 90°, as a result of which the bolt region 50 also rotates, specifically into the locking position. The lever arm portion 60 can form a rearmost end of the actuating region 54.

The gear portion 62 can be arranged inside the bearing body 30. The gear portion 62 can be arranged between the shaft region 52 and the lever arm portion 60. The gear portion 62 can mesh with a (n additional) gear portion 64 of the additional rotary member 34. The rotary members 32, 34 can thus rotate together. A rotation of the rotary member 32 can bring about a rotation of the additional rotary member 34 and vice versa.

The additional rotary member 34 can be rotatably arranged in the recess 40 of the bearing body 30. The additional rotary member 34 can be connected for rotation to the rotary member 32. The additional rotary member 34 can comprise the (additional) gear portion 64 and the (additional) lever arm portion 66.

The gear portion 64 can mesh with the gear portion 62.

The lever arm portion 66 can be arranged in part outside the bearing body 30. The lever arm portion 66 can be actuated for example by the second cam 28 (see FIG. 1) or a control curve in order to move the rotary member 32 into the release position. The second cam 28 or the control curve can rotate the lever arm portion 66, for example by approximately 90°, as a result of which the additional rotary member 34 rotates, which in turn rotates the rotary member 32, as a result of which the bolt region 50 also rotates, specifically into the release position.

The lever arm portion 66 can be actuated for example by the second cam 28 (see FIG. 1) in order to move the rotary member 32 into the release position. The lever arm portion 66 can be swivelled into the recess 40 by rotating the additional rotary member 34 when for example the second cam 28 touches the lever arm portion 66, e.g. when moving the rotary member 32 from the locking position to the release position. The lever arm portion 66 can be swivelled out of the recess 40 by rotating the additional rotary member 34 when for example the first cam 26 touches the lever arm portion 60 of the actuating region 54 of the rotary member 32 and thus rotates the rotary member 32, which in turn rotates the additional rotary member 34. This can take place for example during a movement of the rotary member 32 from the release position to the locking position.

Figure 9:
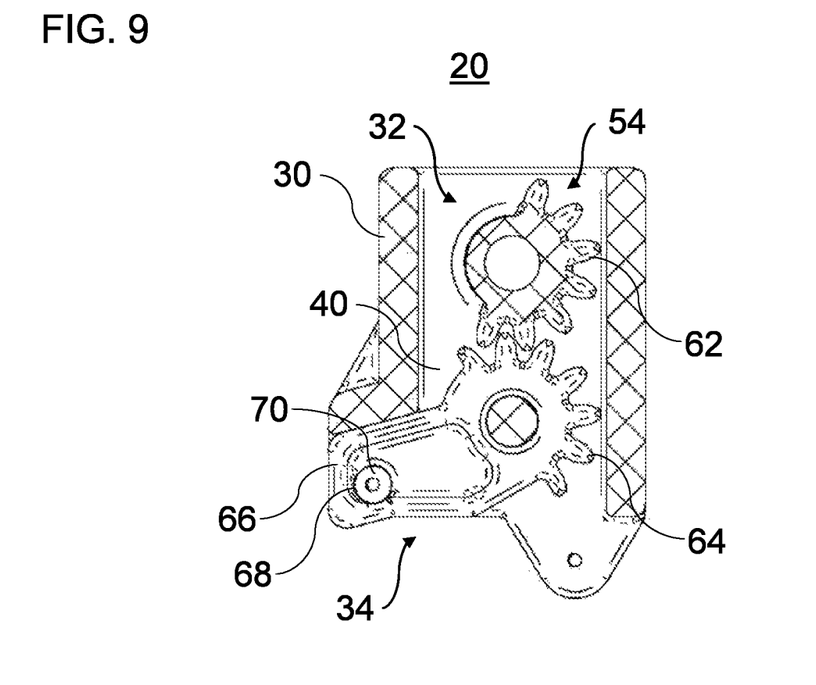
FIG. 9 is a cross-sectional view through the exemplary turn-bolt device.

The additional rotary member 34 can comprise a (n additional) receiving portion 68. Preferably, the receiving portion 68 can be arranged in the lever arm portion 66. In the receiving portion 68, a (e.g. permanent) magnet 70 can be positioned. Preferably, the magnet 70 is adhesively bonded in the receiving portion 68. FIG. 9 shows the receiving portion 68 with the magnet 70 positioned therein. FIG. 10 shows the receiving portion 68 without the magnet 70.

In the release position, the magnet 70 can be directly opposite the magnet 56. The additional rotary member 34 can thus be magnetically locked between the magnets 56 and 70 by an alternating magnetic field. The magnetic locking of the additional rotary member 34 means that the rotary member 32 can also be (indirectly) magnetically locked, since the magnetic locking of the additional rotary member 34 makes movement of the rotary member 32 more difficult.

In the locking position, the magnet 70 can be directly opposite the magnet 58. The additional rotary member 34 can thus be magnetically locked between the magnets 58 and 70 by an alternating magnetic field. The magnetic locking of the additional rotary member 34 means that the rotary member 32 can also be (indirectly) magnetically locked, since the magnetic locking of the additional rotary member 34 makes movement of the rotary member 32 more difficult.

The invention is not limited to the preferred exemplary embodiments described above. Rather, a plurality of variants and variations are possible which also make use of the inventive concept and therefore fall within the scope of protection. In particular, the invention also claims protection for the subject matter and the features of the dependent claims independently of the claims to which reference is made. In particular, the individual features of independent claim 1 are each disclosed independently of one another. In addition, the features of the dependent claims are also disclosed independently of all the features of independent claim 1 and for example independently of the features with respect to the presence and/or the configuration of the bearing body, the rotary member, the actuating region, the bolt region and/or the shaft region of independent claim 1.

LIST OF REFERENCE SIGNS 10 sorting star
12 container
14 feed conveyor
16 first outfeed conveyor
18 second outfeed conveyor
20 turn-bolt device
22 star plate
24 pocket
26 first cam
28 second cam
30 bearing body
32 rotary member
34 additional rotary member
36 mounting hole
38 hole
40 recess
42 passage
44 receiving portion
46 other receiving portion
48 ramp region
50 bolt region
52 shaft region
54 actuating region
56 magnet
58 other magnet
60 lever arm portion
62 gear portion
64 (additional) gear portion
66 (additional) lever arm portion
68 (additional) receiving portion
70 (additional) magnet

The invention claimed is:

1. A turn-bolt device for a transporting star wheel for transporting containers, comprising:
a bearing body; and
a unitary component rotary member, having:
an actuating region for actuating the rotary member;
a bolt region for holding a container; and
a shaft region which integrally inseparably interconnects the actuating region and the bolt region and is rotatably mounted in the bearing body;
wherein the bearing body and the rotary member are formed from a plurality of adjoining material layers, the bearing body has a hole in which the shaft region is rotatably mounted, the bearing body has at least one passage along the shaft region, which interconnects an outer periphery of the bearing body and the hole, and
at least one of:
the at least one passage is in the form of a slot which is oriented parallel to the shaft region; and
the at least one passage has a plurality of passages which are arranged at least one of at a distance from one another with respect to a longitudinal axis of the shaft region and on the same side of the bearing body.

2. The turn-bolt device according to claim 1, wherein the plurality of adjoining material layers are manufactured additively.

3. The turn-bolt device according to claim 1, wherein:
at least one of the bearing body and the rotary member include a plurality of reinforcement parts which are embedded in the adjoining material layers.

4. The turn-bolt device according to claim 3, wherein at least one of:
the reinforcement parts are ball shaped; and
the reinforcement parts are made of a glass material.

5. The turn-bolt device according to claim 1, wherein:
the rotary member can be rotated between a locking position for holding a container via the bolt region and a release position for releasing the container; and
the rotary member can be locked in at least one of the locking position and the release position.

6. The turn-bolt device according to claim 5, wherein at least one of:

the rotary member can be rotated between the locking position for holding the container via the bolt region and the release position for releasing the container by approximately 90°; and the rotary member can be locked in the at least one of the locking position and the release position magnetically.

7. The turn-bolt device according to claim 1, wherein:
the bearing body includes a receiving portion in which a magnet which locks the rotary member in one of the locking position and the release position is arranged.

8. The turn-bolt device according to claim 7, wherein at least one of:
the magnet which locks the rotary member in the one of the locking position and the release position is adhesively bonded; and
the bearing body includes another receiving portion in which another magnet which locks the rotary member in the other of the locking position and the release position is arranged.

9. The turn-bolt device according to claim 1, further comprising:
an additional rotary member which is rotatably mounted in the bearing body and is connected to the rotary member for rotation,
wherein at least one of:
the additional rotary member is formed from a plurality of adjoining material layers;
the additional rotary member has a receiving portion in which a magnet for locking the rotary member is arranged; and
the additional rotary member is connected to the rotary member for rotation so as to mesh with one another.

10. The turn-bolt device according to claim 9, wherein at least one of:
the additional rotary member has a gear portion which meshes with a gear portion of the actuating region; and
the additional rotary member has a lever arm portion for actuation by a cam or a control curve.

11. The turn-bolt device according to claim 1, wherein:
the bearing body has a ramp region, on which the rotary member is guided to reduce longitudinal play of the rotary member during the rotation of the rotary member.

12. The turn-bolt device according to claim 11, wherein at least one of:
the ramp region is an annular-segment-shaped ramp region; and
the bearing body has the ramp region on which the actuating region of the rotary member is guided to reduce the longitudinal play of the rotary member during the rotation of the rotary member.

13. The turn-bolt device according to claim 1, wherein at least one of:
the actuating region has a lever arm portion for actuation by a cam or a control curve; and
the actuating region has a gear portion for actuation by a gear portion of an additional rotary member of the turn-bolt device.

14. The turn-bolt device according to claim 13, wherein at least one of:
the lever arm portion is arranged outside the bearing body; and
the gear portion of the actuating region is arranged inside the bearing body.

15. A transporting star wheel for transporting containers, comprising:
a plurality of turn-bolt devices, each including:
a bearing body; and
a unitary component rotary member, having:
an actuating region for actuating the rotary member;
a bolt region for holding a container; and
a shaft region which integrally inseparably interconnects the actuating region and the bolt region and is rotatably mounted in the bearing body;
wherein the bearing body and the rotary member are formed from a plurality of adjoining material layers, and the plurality of turn-bolt devices are arranged around a periphery of the transporting star wheel, the bearing body has a hole in which the shaft region is rotatably mounted, the bearing body has at least one passage along the shaft region, which interconnects an outer periphery of the bearing body and the hole, and
at least one of:
the at least one passage is in the form of a slot which is oriented parallel to the shaft region; and
the at least one passage has a plurality of passages which are arranged at least one of at a distance from one another with respect to a longitudinal axis of the shaft region and on the same side of the bearing body.

16. The transporting star according to claim 15, further comprising:
at least one star plate which has, on the periphery thereof, a plurality of pockets for receiving the containers, wherein the plurality of turn-bolt devices are arranged for holding the containers in the plurality of pockets.

17. A method for producing a turn-bolt device for a transporting star wheel for transporting containers, comprising:
additively manufacturing the turn-bolt device having a bearing body and a unitary component rotary member having an actuating region for actuating the rotary member, a bolt region for holding a container and a shaft region which integrally inseparably interconnects the actuating region and the bolt region and is rotatably mounted in the bearing body, wherein the bearing body and the rotary member are additively manufactured together; and
at least one of:
removing loose material powder which is arranged between the bearing body and the rotary member through at least one passage in the bearing body after the additive manufacturing, and
positioning at least one magnet in at least one of the bearing body and an additional rotary member of the turn-bolt device.

18. The method according to claim 17, wherein the bearing body and the rotary member are additively manufactured together at least one of in a powder bed process and with embedding reinforcement parts.

19. The method according to claim 17, wherein at least one of:
the rotary member is additively manufactured together with the bearing body, in part inside and in part outside the bearing body;
the bearing body and the rotary member are additively manufactured together with a gap arranged therebetween;
the bearing body and the rotary member are additively manufactured together in such a way that the rotary member is axially secured in the bearing body by the bolt region and the actuating region; and
during the additive manufacture, an additional rotary member, which is connected for rotation to the rotary member, is additively manufactured together with the bearing body and the rotary member.

20. The method according to claim 17, wherein at least one of:
the positioning the at least one magnet is via adhesively bonding; and
further comprising magnetically locking the rotary member via the positioning of the at least one magnet in the at least one of the bearing body and an additional rotary member of the turn-bolt device.

* * * * *